United States Patent [19]

Hoerauf et al.

[11] 4,002,430
[45] Jan. 11, 1977

[54] EXTRACTION TUBE FOR POLYAMIDES

[75] Inventors: Werner Hoerauf; Ernst Guenther; Ernst Kissel; Guenter Valentin, all of Ludwigshafen; Ernst Dietrich, Worms, all of Germany

[73] Assignee: BASF Aktiengesellschaft, Ludwigshafen (Rhine), Germany

[22] Filed: Jan. 27, 1975

[21] Appl. No.: 544,305

[30] Foreign Application Priority Data

Jan. 31, 1974 Germany .................... 2404510

[52] U.S. Cl. .................... 23/270 R; 23/288 G;
196/14.52; 260/96 R; 260/78 L; 260/78 S;
260/705; 165/148
[51] Int. Cl.² .................... B01D 11/02
[58] Field of Search .............. 196/14.52; 23/270 R,
23/288 G; 165/148, 108, 162, 109 T, 147;
260/96 R, 78 L, 78 S, 705

[56] References Cited

UNITED STATES PATENTS

| 2,419,508 | 4/1947 | Simpson | 23/288 G |
|---|---|---|---|
| 2,487,796 | 11/1949 | Evans | 23/288 G |
| 2,578,670 | 12/1951 | Carleton | 202/158 |
| 2,646,392 | 7/1953 | Gerhold | 202/158 |
| 2,764,620 | 9/1956 | Findlay | 23/270 R |
| 2,816,010 | 12/1957 | Shabaker | 23/288 G |
| 3,423,183 | 1/1969 | Goetzke | 196/14.52 |

FOREIGN PATENTS OR APPLICATIONS

| 821,464 | 8/1969 | Canada | 23/270 R |
|---|---|---|---|
| 1,067,290 | 10/1959 | Germany | 23/270 R |

Primary Examiner—Stephen J. Emery
Attorney, Agent, or Firm—Johnston, Keil, Thompson & Shurtleff

[57] ABSTRACT

An extraction tube for the continuous removal of low molecular weight components of polylactam granules by means of hot water by the countercurrent principle of operation, the water being fed upwardly and the granules downwardly, the tube being provided with inlets and outlets for the granules and the water and exhibiting baffles within the tube, wherein there is provided, within the tube, a heat exchanger which a. divides the tube into two sections bearing a ratio to each other of from 50:50 to 85:15 by volume, the smaller section being at the top of the tube,
b. exhibits ducts for the granules over the entire cross-section of the tube and
c. has top surfaces facing the stream of granules, which surfaces are inclined toward the ducts to an angle $\beta$ to the horizontal, this angle being equal to or greater than the angle of repose of the granules but less than 90°, further similar heat exchangers being provided beneath said heat exchanger if desired.

3 Claims, 3 Drawing Figures

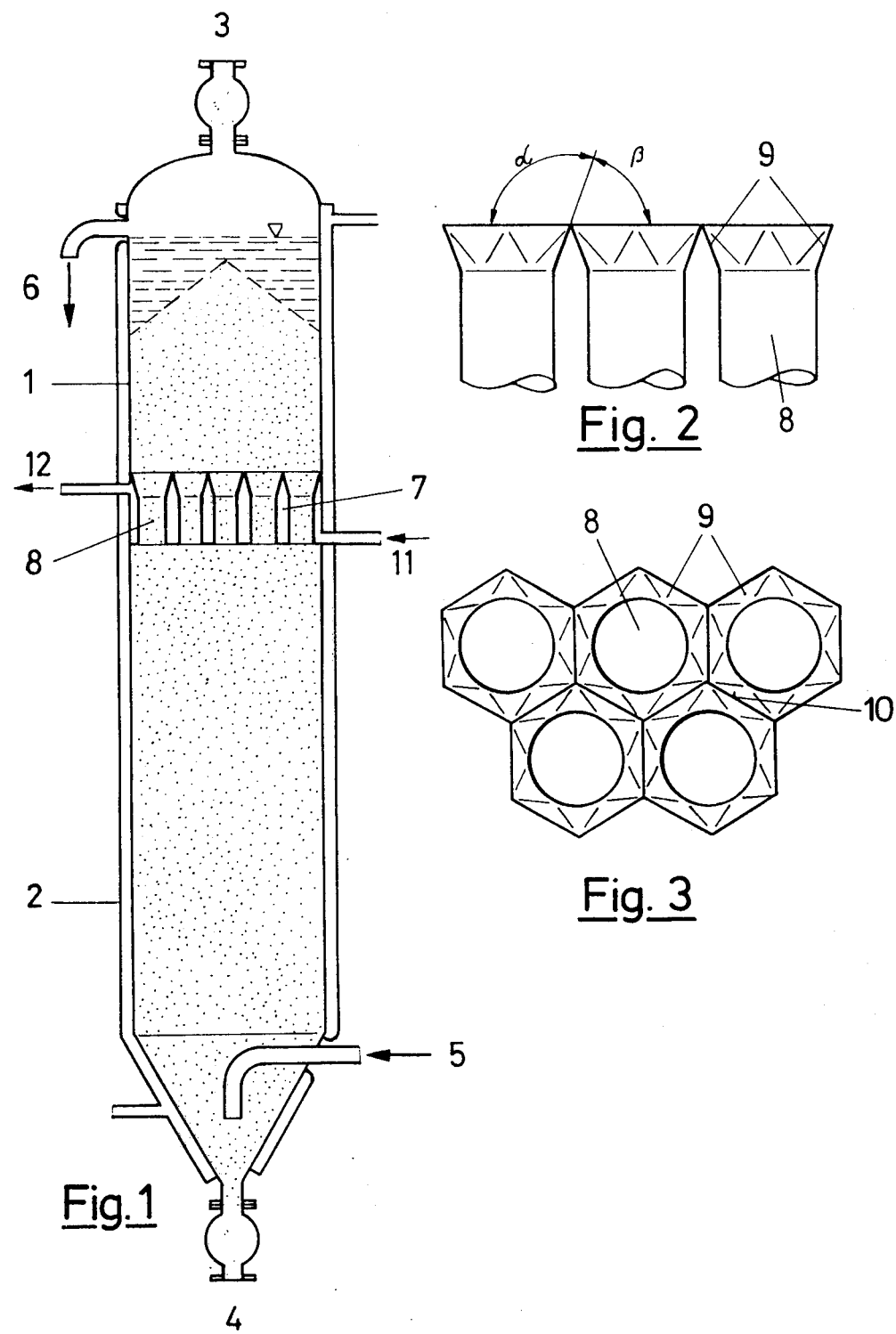

EXTRACTION TUBE FOR POLYAMIDES

This invention relates to an extraction tube for the continuous extraction of monomer-containing and/or oligomer-containing polylactam granules with heated water by the countercurrent principle of operation.

German Published Application 1,519,935 discloses a method of extracting polycaprolactam granules countercurrently with hot water to remove the monomeric and/or oligomeric material. The extraction tube described therein contains a number of bottlenecks distributed over the height of the tube, the purpose of which is to accelerate the upwardly flowing water such that any undesirable downward countercurrents are forced back. However, the said reference contains no concrete information on how the said undesirable countercurrents are determined and then satisfactorily forced back.

It is an object of the invention to provide an extraction tube which affords efficient and uniform extraction of the granules.

This object is achieved by an extraction tube for the continuous removal of low molecular weight components of polylactam granules by means of hot water by the countercurrent principle of operation, the water being fed upwardly and the granules downwardly, the tube being provided with inlets and outlets for the granules and the water and exhibiting baffles within the tube, wherein there is provided, within the tube, a heat exchanger which a. divides the tube into two sections bearing a ratio to each other of from 50:50 to 85:15 by volume, the smaller section being at the top of the tube,
b. exhibits ducts for the granules over the entire cross-section of the tube and
c. has upper surfaces facing the stream of granules, which surfaces are inclined toward the ducts at an angle $\beta$ to the horizontal, this angle being equal to or greater than the bulk angle of the granules but less than 90°, further similar heat exchangers being provided beneath said heat exchanger if desired.

Suitable polylactams are generally those which are obtainable by polymerization of lactams having from 4 to 12 carbon atoms such as capryllactam, lauryllactam and, in particular, caprolactam, or by polymerization of corresponding carboxylic acids. A very particularly suitable polylactam is polycaprolactam.

The molecular weight of the polylactams is generally such as to render them spinnable. Common polylactams have relative viscosities of from 1.5 to 5, as measured in 1% w/w solution in 96% w/w sulfuric acid at 25° C. The size of the granules is generally from 1 to 5 and in particular from 1.5 to 3.5 mm. After their formation, the polylactams may contain up to 10 to 15% w/w of monomeric or oligomeric, e.g. dimeric, trimeric or tetrameric, lactams.

FIG. 1 is a vertical section of an extraction tube 1 having a heating or insulating jacket 2, an inlet 3 and outlet 4 for the granules, an inlet 5 and outlet 6 for the extraction water, heat exchanger 7 with ducts 8 for the granules and, optionally, an inlet 11 and outlet 12 for a heating medium for use in the heat exchanger.

FIG. 2 is a vertical section through a portion of the heat exchanger 7 showing the surfaces 9 facing the stream of granules and defining the angle $\beta$.

FIG. 3 is an advantageous embodiment of the cross-section of the heat exchanger, as seen from above, showing the surfaces 9 together forming edges 10.

The extraction tube is substantially vertical. Its internal diameter may be up to several meters and is advantageously at least 1.4 m and in particular from 1.4 to 4 m. In general, the length of the tube is several times, e.g. from 5 to 20 times, its width. Advantageously, the extracton tube is externally heatable and well insulated to avoid heat losses. Expediently, the external heating approximately takes into consideration the rise in temperature in the extraction tube. Thus the extraction tube can have an insulating and/or heating jacket which may, if desired, be subdivided to effect independent heating in separate zones.

The extraction tube is internally divided by the heat exchanger to form sections bearing a ratio to each other of from 50:50 to 85:15 and in particular from 60:40 to 80:20, by volume. This ratio does not include the volume of the heat exchanger or the free space above the level of the granules. The length of the heat exchanger or heat exchangers is conveniently from 1/20 to 1/7 of the total length of the extraction tube.

The heat exchanger has ducts for the granules, these ducts being distributed over the entire cross-section of the tube. The number of such ducts depends, of course, on their size and on the diameter of the tube. These ducts for the granules generally have an internal diameter of from 2 to 25 and in particular from 6 to 12 cm. They may be present in a number of, say, from 5 to 600 and in particular from 35 to 100 for each square meter of the cross-section of the extraction tube.

The top surfaces of the heat exchanger facing the stream of granules are inclined toward the said ducts. They may together form edges and thus form roof-like junctions. The angle of inclination of the top surfaces of the heat exchanger to the horizontal is given by the angle $\beta$ (see FIG. 2). The angle $\beta$ is greater than the angle of repose of the granules to be extracted, and is less then 90°. The angle $\beta$ is thus the acute angle formed between the said surfaces and the horizontal and not the obtuse complementary angle $\alpha$. The angle of repose of the granules is measured under water with the granules in a water-swollen state and may be readily determined by simple experiments.

The angle of repose of cylindrical polycaprolactam granules (diameter 2.5 mm, length 2.7 mm) under water at 90° C is, for example, 37°. For engineering reasons, it is advantageous to use an angle $\beta$ which is not more than 83°. Satisfactory use has been made of angles between 45° and 83°.

To avoid surfaces offering resistance to the flow of the granules and to ensure that the the surfaces of the heat exchanger have the desired angle of inclination, the said surfaces are arranged in a specific manner so as to form edges. For example, an advantageous arrangement of the surfaces and ducts for the granules is one in which the edges formed by the inclined surfaces form a lattice or honeycomb pattern including, say, rectangular or, in particular, hexagonal openings. The inclined surfaces of the ducts for the granules in the heat exchanger are advantageously continued by vertical tubes to ensure smooth transport of the granules therethrough.

The heat exchanger may be heated in conventional manner, for example by means of a medium flowing through it, for example water, diphenyl or steam, or by means of electrical heaters.

Further similar heat exchangers, for example one or two such heat exchangers, may be disposed at vertical intervals below the heat exchanger described which, as stated, is located in the upper half of the extraction tube. Although the presence of one heat exchanger in the extraction tube makes substantial extraction of the granules possible, the extracting efficiency may be increased by the presence of one or more additional heat exchangers below the first heat exchanger.

The heat exchanger(s) divides the extraction tube into two or more zones, i.e. sections. The purpose of such heat exchangers is to heat the water flowing upwardly therethrough to such an extent that, despite its increased content of extract, the density of the water in a zone immediately above a heat exchanger is less than that in the zone immediately below that heat exchanger by at least 0.0002 and in particular by from 0.0005 to 0.004 g/cm$^3$.

It is desirable to use water having as high a temperature as possible, i.e. just below the boiling point of the water or aqueous solution of extract, one reason being the accelerated diffusion caused thereby. Since the said differences in density between the zones are effected by temperature leaps within the heat exchangers, the required temperature of the water flowing into the extraction tube at the bottom is governed by the temperature desired in the uppermost zone. Temperatures of from 95° to 99° C in the uppermost zone have been successfully used at atmospheric pressure. To achieve the required density differential of the extraction water it has been found advantageous to produce a temperature difference of from 4° to 9° C and in particular from 6° and 8° C by means of the top heat exchanger. If other heat exchanges are present, it is generally sufficient for them to effect a temperature rise of from 2° to 4° C. It is the object of the heat exchanger(s) to prevent backmixing of the water contained in the upper zone, which contains more extract, with the water contained in the lower zone. It has been found advantageous for the water fed to the extraction tube to have a temperature of from 80° to 95° C and in particular of from 85° to 90° C, when extraction is to be carried out at atmospheric pressure.

The important heat exchanger in the extraction tube is the uppermost one. In the zone formed above this heat exchanger, a high percentage of the monomers and/or oligomers in the granules passes into the water on account of the high temperature of the extraction water and the high concentration of said monomers and/or oligomers in the polylactam granules. Thus the density of the aqueous solution of extract in this uppermost zone is relatively high. In order to prevent backmixing with the water in the zone below said heat exchanger, it is necessary to cause a relatively high temperature leap in said first heat exchanger, as stated.

The density of the aqueous extract in the individual zones may be determined in conventional manner. The temperature leap in the heat exchanger(s) necessary for the density differential required may be readily determined by taking samples from the zones or by simple experiment.

Extraction is generally carried out at atmospheric pressure in which case the upper limit of the temperature of the water is defined by the normal boiling point of about 100° C. However, it is possible, in principle, to operate at higher temperatures such as up to 140° C and in particular up to 130° C and thus at the corresponding superatmospheric pressure.

The velocity of the slowly falling bulk granules is relatively low, generally being from about 0.2 cm/min to 5 cm/min and in particular from 0.4 cm/min to 2 cm/min. This comparatively slow drop of the granules is generally effected by the gravity alone. The rate of throughput of the water through the extraction tube filled with granules is advantageously from 0.5 cm/min to 20 cm/min and in particular from 1.0 cm/min to 10 cm/min, as measured in the zones above and below the heat exchanger(s).

The level of the water in the extraction tube may be simply controlled by means of an overflow device at the top of the extraction tube, the granules being advantageously covered by a layer of water.

The ratio of granules to water is advantageously from 1:0.7 to 1:3.5, by weight, based on unextracted granules. The ratio used is governed by the desired concentration of lactam in the aqueous extract and in the extracted granules.

If desired, extraction may be carried out under a protective gas, but the protective atmosphere afforded by the steam formed is generally sufficient.

To increase the efficiency of extraction, the extraction tube may be provided with means to cause pulsation of the stream of water, i.e. means for causing brief periodic additional acceleration of the water countercurrently and cocurrently with the stream of granules, for example pumps. An example of suitable means is a pump arrangement which gives the water additional upward acceleration, this being combined with an outlet at the bottom of the extraction tube down which a portion of the water can flow to be recycled to the pump.

Following following extraction, the granules are dried using conventional methods and equipment.

The heat exchangers used in the present invention constitute extremely effective barriers preventing backmixing of the extraction water laden with lactam and oligomers from a zone above the heat exchanger to the zone immediately below the heat exchanger.

The use of the extraction tube of the invention permits variation in the throughput rates of granules and water up to complete interruption of extraction. Even when the water feed is stopped, the heat exchangers retain their barrier effect. This constitutes a highly stabilizing factor in the overall manufacture of granules, even in cases where, for example, breakdowns occur in the feed of extraction water or in the granule-drying operation which generally follows.

In the extraction tube of German Published Application No. 1,519,936 variation of the throughput of granules and thus of water is possible only within narrow limits. The bottlenecks shown in FIGS. 1 and 2 are rigid and those of FIG. 3 can only be varied by stopping extraction and emptying the tube of granules, i.e. only in a complicated manner involving the well-known drawbacks of interrupting continuous processes. A rigid diameter of the bottleneck, as fixed more or less by the equipment dimensions, also determines the minimum rates of flow for preventing downward movement of the extract-containing water of higher specific gravity, i.e. this also fixes the rate of flow of the granules and thus the throughput through the tube.

Since the heat exchanger used in the present invention has ducts for the granules distributed over the entire cross-section of the tube, the said heat exchanger causes no impairment of the flow profile of the granules, unlike the use of a single central bottleneck as described in said German Published Application No. 1,519,936. Improved uniformity of the stream of granules signifies improved uniformity of the residence time, which in turn gives improved uniformity of the content of extract, the viscosity and the tinctorial quality.

In the case of the baffles or insertions in the extraction tube described in German Published Application No. 1,519,936 giving relatively central bottlenecks, a more or less centrally increased movement in the granules resembling parabolic flow is to be expected. This involves the risk of an inconsistent residence time of the granules in the extraction tube tending to give uneven extraction, and also the risk of the production of inconsistent viscosity values due to partial hydrolysis and the risk of damage to the granules subjected to overlong residence times.

In all, the use of the extraction tube of the invention permits continuous uniform extraction over long periods.

EXAMPLE 1

Polycaprolactam granules (relative viscosity 2.4, cylinders having a diameter of 2.5 mm and a length of 2.7 mm, bulk density 0.65 kg/cm$^3$) are passed continuously downwardly through a vertical extraction tube (height 20 m, internal diameter 1.9 m) under gravity at a velocity of 0.8 cm/min. Water is fed continuously upwardly at a velocity of 1.6 cm/min. The angle of repose of the granules is 37°, as measured on water-swollen granules in hot water at 90° C. The extraction tube is subdivided into three zones by two heat exchangers located within the tube. The ratio of the zones below the level of the granules is, from top to bottom, 20:20:60, by volume ignoring the volume of the heat exchangers and the ducts therein. Each of the heat exchangers has 150 cylindrical ducts for the granules distributed over the cross-section of the tube, each of the ducts having an internal diameter of 10 cm. The inclined surfaces of the heat exchanger form an angle $\beta$ of 80° with the horizontal. Each duct has a hexagonal inlet with inwardly sloping surfaces. Adjacent inlet surfaces of adjacent ducts together form edges and ridged-roof junctions. The edges, seen in cross-section, form a lattice of hexagonal openings. The ducts are thus provided in a honeycomb arrangement. The length of each heat exchanger is 95 cm.

The densities of the water in the three zones are as follows: Upper zone 0.9625, middle zone 0.9656, lower zone 0.9672 g/cm$^3$. These differences in density prevent backmixing of extraction water in a higher zone with the water in a zone immediately below. The respective temperatures in the zones are, from top to bottom, 98° C, 91° C and 88° C. Hot water flows through the heat exchangers. The entire extraction tube is surrounded by a heating jacket and an insulating jacket. The ratio of granules to water is 1:2, by weight. Starting from granules having a content of extractables of 11% w/w there are obtained granules having a residual content of 0.4% w/w.

EXAMPLE 2

Example 1 is repeated except that at intervals of 3 minutes 50% of the water present in the ducts of a heat exchanger is given an additional upward urge through the extraction tube at 40 times its basic velocity, the level of the water being set at about 100 cm above the top limit of the granules by means of an overflow arrangement. The same amount of water is then allowed to recede in the direction of flow of the granules but only to such an extent that the granules always remain covered by water.

At a ratio of granules to water of 1:1.1 by weight there are obtained granules having a residual content of 0.4% by weight.

We claim:

1. A tubular extraction apparatus for the continuous removal of low molecular weight components from polylactam granules by extraction with hot water using the countercurrent principle of operation, the water being fed upwardly and the granules downwardly, said apparatus comprising:
   A. a vertically positioned, elongated extraction tube having inlet and outlet means for the granules and the water; and
   B. at least one heat exchanger disposed laterally within the tube to divide the tube vertically into separate extraction zones with heating means in each heat exchanger to decrease the density of the water in a zone immediately above said heat exchanger in comparison to the density of the water immediately below the same heat exchanger, said at least one heat exchanger dividing the tube into an upper section extending above said at least one heat exchanger and a lower section extending below said at least one heat exchanger, the ratio of said sections to each other being from 50:50 to 85:15 by volume, excluding the volume of each heat exchanger and also excluding the free space above the level of granules in the tube, the smaller section being above the lowermost heat exchanger in the tube, each heat exchanger having a plurality of vertical ducts joined in a honeycomb pattern distributed over the entire cross-section of the tube for the uniform downward flow of granules with upper inlet surfaces leading into each duct on the upper side of said heat exchanger facing the stream of granules, said inlet surfaces being inclined to taper inwardly toward the vertical ducts at an angle $\beta$ to the horizontal of from about 45° to about 83°, the vertical length of each heat exchanger being 1/20 to 1/7 of the total length of the extraction tube.

2. Tubular extraction apparatus as claimed in claim 1 in which said ratio of said sections to each other is from 60:40 to 80:20 by volume.

3. Tubular extraction apparatus as claimed in claim 1 having two to three heat exchangers disposed at vertical intervals in said extraction tube.

* * * * *